United States Patent
Garimella et al.

(10) Patent No.: US 8,494,167 B2
(45) Date of Patent: Jul. 23, 2013

(54) METHOD AND APPARATUS FOR RESTORING ENCRYPTED FILES TO AN ENCRYPTING FILE SYSTEM BASED ON DEPRECATED KEYSTORES

(75) Inventors: Neeta Garimella, San Jose, CA (US); Alexei Kojenov, Beaverton, OR (US); Shawn P. Mullen, Buda, TX (US); Ravi A. Shankar, Austin, TX (US); John Viksne, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1376 days.

(21) Appl. No.: 11/929,103

(22) Filed: Oct. 30, 2007

(65) Prior Publication Data

US 2009/0110198 A1 Apr. 30, 2009

(51) Int. Cl.
*H04K 1/04* (2006.01)
*H04K 1/10* (2006.01)

(52) U.S. Cl.
USPC .......................................... 380/277; 726/36

(58) Field of Classification Search
USPC ............. 713/165, 153, 182; 709/223; 705/71; 380/277
See application file for complete search history.

(56) References Cited

U.S. PATENT DOCUMENTS

| | | | |
|---|---|---|---|
| 6,981,138 B2 | 12/2005 | Douceur et al. | |
| 7,181,016 B2 | 2/2007 | Cross et al. | |
| 2002/0019935 A1* | 2/2002 | Andrew et al. | 713/165 |
| 2002/0099666 A1* | 7/2002 | Dryer et al. | 705/71 |
| 2002/0138722 A1* | 9/2002 | Douceur et al. | 713/153 |
| 2005/0091487 A1* | 4/2005 | Cross et al. | 713/165 |
| 2005/0120106 A1* | 6/2005 | Albertao | 709/223 |
| 2006/0136735 A1* | 6/2006 | Plotkin et al. | 713/182 |
| 2006/0210082 A1* | 9/2006 | Devadas et al. | 380/277 |

OTHER PUBLICATIONS

Davide, Pozza, Autometic Cryptographic protocol Java Code Generation from spl calculus; Year: 2004; IEEE; pp. 1-6.*

(Continued)

*Primary Examiner* — Mohammad W Reza
*Assistant Examiner* — Monjour Rahim
(74) *Attorney, Agent, or Firm* — David Mims; Robert C. Rolnik

(57) ABSTRACT

The present invention provides a computer implemented method, data processing system, and computer program product to restore an encrypted file. A computer receives a command to restore an encrypted file, wherein the encrypted file was previously backed up. The computer identifies a user associated with the encrypted file. The computer looks up a first keystore of the user based on the user, the first keystore having an active private key. The computer determines that a public key of the encrypted file fails to match an active public key of the first keystore. The computer restores a second keystore of the user to form a restored private key, wherein the second keystore was previously backed up. The computer responsive to a determination that the public key of the encrypted file fails to match the active public key of the first keystore, decrypts the encrypted file encryption key based on the restored private key to form a file encryption key. The computer encrypts the file encryption key with the active private key of the first keystore.

17 Claims, 3 Drawing Sheets

OTHER PUBLICATIONS

Author: IBM; Title: Transparent EFS—Keystore Management on Backup and Restore of EFS Files; Item: Paper; Date: Oct. 18, 2007; pp. 2; Issue No. IPCOM000159368D; Publisher: IP.com; Location: http://www.ip.com/pubview/IPCOM000159368D.

Author: Microsoft; Title: Encrypting File System for Windows 2000; Item: Paper; Date: Jul. 1, 1999; pp. 32; Issue No. XP-002319388; Publisher: Microsoft; Location: http://www.microsoft.com/windows.

Author: Microsoft; Title: How to Back Up the Recovery Agent Encrypting File System (EFS) private key in Windows Server 2003; in Windows 2000, and in Windows XP; Item: Paper; Date: Aug. 24, 2007; pp. 3; Issue No. XP-002514686; Publisher: Microsoft; Location: http://support.microsoft.com/kb/241201/EN-US.

* cited by examiner

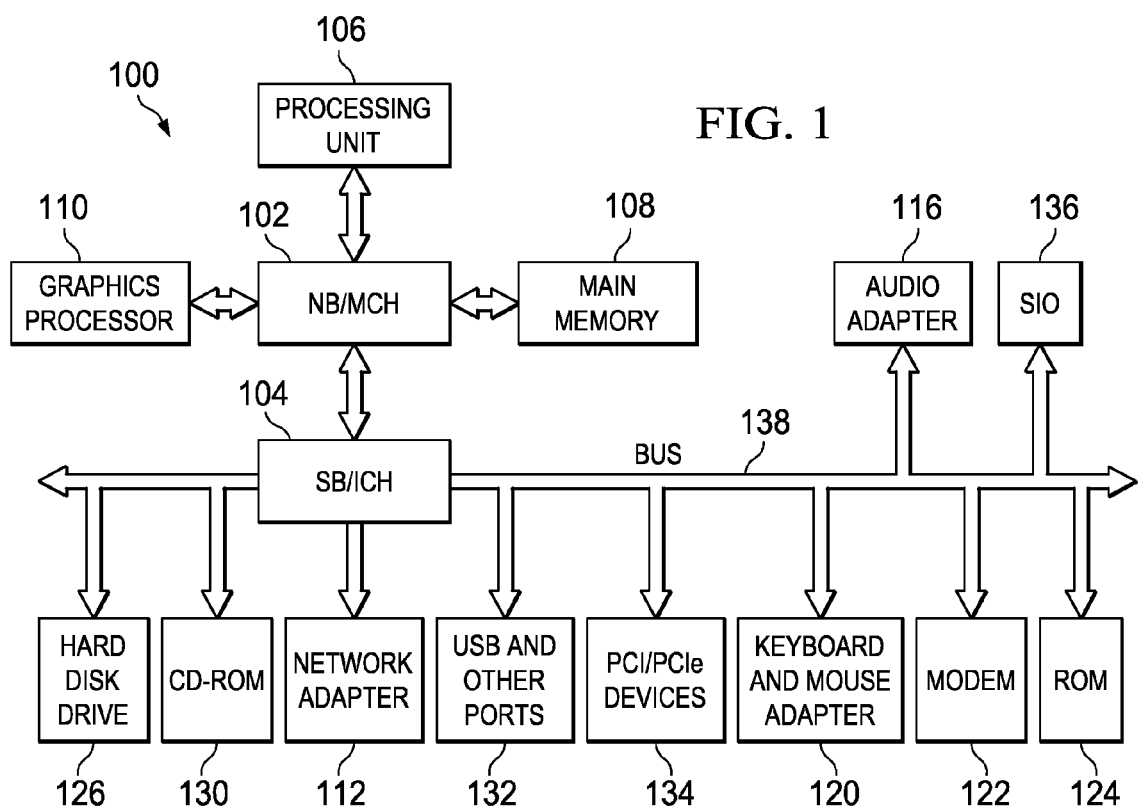

METHOD AND APPARATUS FOR RESTORING ENCRYPTED FILES TO AN ENCRYPTING FILE SYSTEM BASED ON DEPRECATED KEYSTORES

BACKGROUND OF THE INVENTION

1. Field of the Invention

The present invention relates generally to a computer implemented method, data processing system, and computer program product for assuring security in file backup infrastructure. More specifically, the present invention relates to retrieval of backup files and correspondingly restoring such files to a useful state for a user.

2. Description of the Related Art

File systems provide a data structure within which to organize files. Such systems may be organized across several hard disks, and even placed across several computers in a computer network. Despite a file system being accessible through a network, computer users have found it desirable to limit which users can read or write to each file of the file system.

One limitation placed on files is 'permissions', whereby a user may prohibit anyone, or people not in his group from accessing the file. Still another limitation placed on some files is encrypting the file, so that even if the file were to be disassociated from the file system, the file would retain a privacy feature.

Encryption features of a file may be embedded in metadata associated with the file. Files are associated with metadata that describe statistics, and other information about the file. In an encrypting file system (EFS), a file also has crypto metadata that supports encryption features. Crypto metadata is data that provides details concerning who is authorized to access the file, and in what manner the file is encrypted. For example, crypto metadata can include a public key of the user that encrypted the file. In addition, crypto metadata can include an encrypted file encryption key.

A file encryption key is a key used to encrypt a file. The file encryption key may be abbreviated as Fk. The file encryption key may be assigned uniquely to a file. The file encryption key may be formed by a hash function that reduces the chances that a second file will share the same file encryption key. The hash function can be a randomizing function. The file encryption key may be a symmetric key such that the file encryption key may be used to decrypt the associated file.

An encrypted file encryption key is an encrypted version of Fk, the key used to encrypt the associated file. Fk is encrypted with, for example, a public key of the user. In this arrangement, where the public key is an asymmetric key or part of a public key pair, an associated private key can be used to decrypt the encrypted key to form Fk. Once Fk is obtained, decrypting the associated file becomes a trivial exercise for modern personal computers. Because Fk is stored as metadata of the file, albeit in encrypted form, Fk is considered part of the file. Thus, decrypting the encrypted Fk is considered decrypting the file.

Administrators of computer systems back up files for a number of reasons. Such reasons include, for example, guarding against accidental file deletion or corruption; mitigating human made disasters; and mitigating natural disasters. Natural disasters tend to occur across a geographic area. Such areas can be small, as in the case of a path of destruction caused by a tornado. Such areas can be large, as in the case of a zone impacted by an earthquake. To avoid subjecting a primary copy of a file and the backup copy of a file to the same disaster, administrators place backup files at a distance from the primary file that is a source for the backup file. Under such a backup regime, the backup file is offsite from the primary file. Offsite is a relative term that describes a location for an activity or apparatus as related to another activity or apparatus. One activity is offsite relative to a second activity if the two activities are sheltered under independent roofs or other shelter. Two roofs can be independent even though such roofs may be connected by a tunnel, ramp, breezeway, skybridge, utility conduit, or the like. Offsite can mean that one activity occurs in one zip code or postal code, while the second activity occurs in a second zip code or postal code.

Users can deprecate public key pairs. A public key pair is a public key and its corresponding private key. When deprecating a public key pair, a user instructs a file system to delete the public key pair, and replaces it with another public key pair, which remains an active public key pair until it too is deprecated. Unfortunately, files created with a deprecated public key pair cannot be used by the user without modification. A user would benefit if some method to modify or update the file, particularly a backed up file, were available.

SUMMARY OF THE INVENTION

The present invention provides a computer implemented method, data processing system, and computer program product to restore an encrypted file. A computer receives a command to restore an encrypted file, wherein the encrypted file was previously backed up. The computer identifies a user associated with the encrypted file. The computer looks up a first keystore of the user based on the user, the first keystore having an active private key. The computer determines that a public key of the encrypted file fails to match an active public key of the first keystore. The computer restores a second keystore of the user to form a restored private key, wherein the second keystore was previously backed up. The computer responsive to a determination that the public key of the encrypted file fails to match the active public key of the first keystore, decrypts the encrypted file encryption key based on the restored private key to form a file encryption key. The computer encrypts the file encryption key with the active private key of the first keystore.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in accordance with an illustrative embodiment of the invention;

DETAILED DESCRIPTION OF THE PREFERRED EMBODIMENT

Figure 2A:
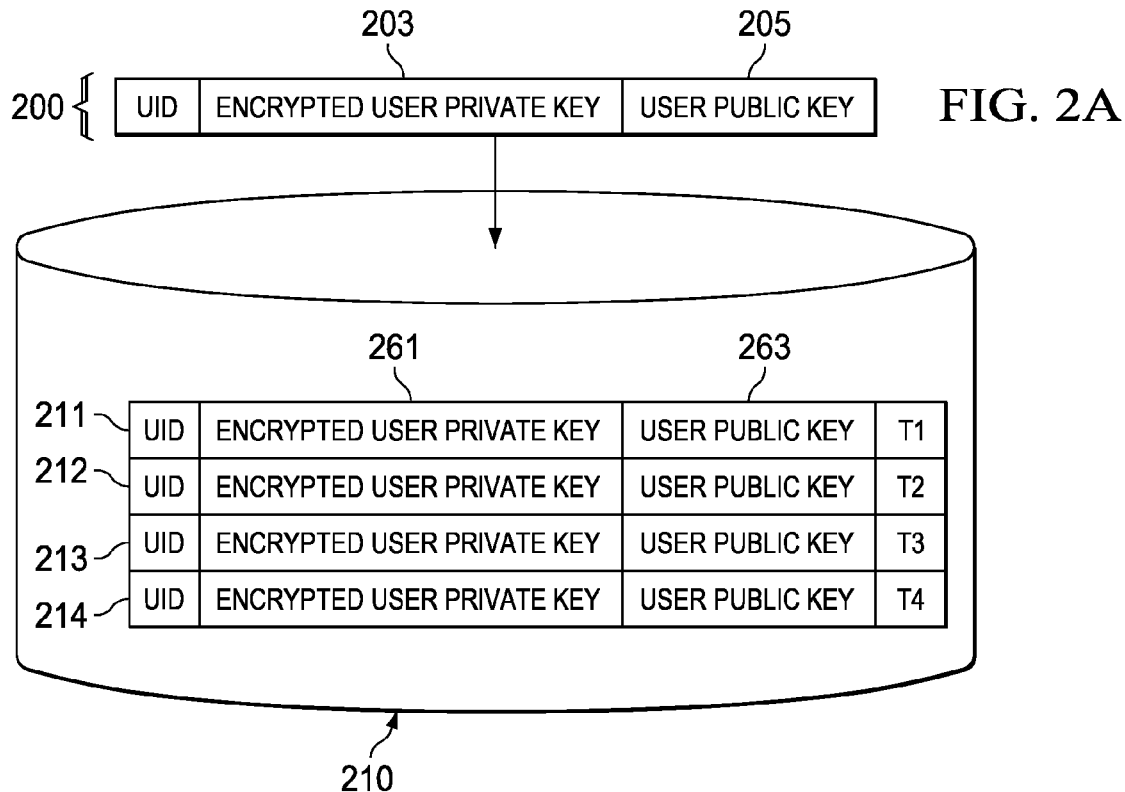
FIG. 2A shows a keystore and deprecated keystores in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS) Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The aspects of the illustrative embodiments include a computer implemented method, data processing system, and computer program product for backing up and restoring files in an encrypting file system (EFS). An individual user may deprecate a key pair between backup cycles and still obtain use of his backed up files. Through a single command specifying at least one file, the file may be restored such that a crypto metadata is available for ready decryption and other security operations on the file.

A user is a unique identifier of one or more sessions that were started using a set of credentials, or a properly updated set of credentials based on the set of credentials. The user is usually associated with an individual who keeps at least one aspect of the credentials private but shared with an authentication mechanism of a data processing system. The aspect can be a password. The user can be a public key of a public key pair, and may be unique.

FIG. 2A shows a keystore and deprecated keystores in accordance with an illustrative embodiment of the invention. A keystore is a public key associated with a private key. The data processing system may encrypt the private key with a user's password. Thus, the data stored with the public key may be an encrypted version of the private key. User identifier 201 is associated with a keystore. User identifier 201 is a unique number that identifies a user when that individual is logged in to a data processing system, for example, data processing system 100 of FIG. 1. Keystore 200 comprises an encrypted user private key 203 and user public key 205. A public key is a key associated with a user that is associated with a private key. A public key pair is the public key and its associated private key. The public key can be used to decrypt data encrypted by the private key. The private key can be used to decrypt data encrypted by the public key. A private key is a key associated with the user and generally stored under safeguards to reduce its dissemination. The public key can be circulated publicly while the user can limit access for data encrypted by the private key. However, a private key that is known to be accessible to another person may not credibly be considered secret. Consequently, the private key is no longer useful in limiting unknown parties from seeing data encrypted by the public key. A private key that is known to be accessible to another individual is said to be compromised. Thus, to enhance privacy, the user private key is encrypted and stored as encrypted user private key 203.

With each successive backup of one or more files owned by a user, an EFS supporting data processing system may store the current key pair to backup repository 210. A backup repository is non-volatile storage that keeps a copy of data for a user. Data may be a file, for example, a keystore. Each file may be associated with a time so that a user may select which among several backups is to be restored. FIG. 2A shows four backed up keystores. First keystore 211 is associated with time T1 221. Second keystore 212 is associated with time T2 222. Third keystore 213 is associated with time T3 223. Fourth keystore 214 is associated with time T4 224.

Figure 2B:
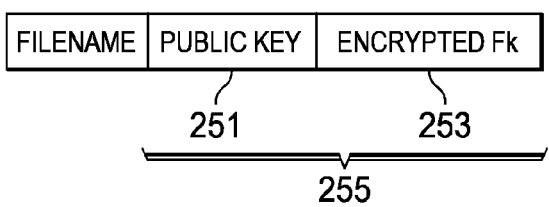
FIG. 2B shows metadata and crypto metadata in accordance with an illustrative embodiment of the invention.

FIG. 2B shows metadata and crypto metadata in accordance with an illustrative embodiment of the invention. A file may include metadata. Metadata is data about data. A file system can keep metadata such as timestamps, mode bits, filenames and the like, associated with a file. Some file systems store such information in a specialized data structure called an inode. An encrypting file system (EFS) stores crypto metadata. Crypto metadata is a public key and an encrypted private key and may optionally include other data useful to decrypt a file or locate a user associated with a file. The public key and the private key may be associated together as a public key pair. Metadata 250 includes, for example, public key 251. Public key 251 is a unique identifier of the user that created or otherwise owns the file associated with metadata 250. Paired with public key 251 is a file encryption key, Fk, as explained above. Fk is stored as encrypted file encryption key 253. Crypto metadata is a subset of metadata. Crypto metadata 255 includes, for example, public key 251 and encrypted file encryption key 253.

Fk is not readily readable to a user. Fk is encrypted using the user private key associated with public key 251. An encrypted private key is a private key that is encrypted. The private key can be encrypted with a password of a user. Consequently, any such encryption on the private key may assure a heightened probability that the individual that uses a session, user, is the only individual having access to the private key. For example, encrypted file encryption key 253 may be encrypted with a user private key formed by decrypting encrypted user private key 261. Further in this example, when forming the crypto metadata 255, the EFS uses user public key 263 as an identifier in public key 211. In other words, a data processing system forms a copy of a user public key in a file's crypto metadata to enhance retrieval by the associated user and diminish clear-text use of the file by non-users. The file, however, is not useful if only data of keystore 200 is used. Since FIG. 2B depicts a situation where keystore 200 is active and keystore 204 is not active, an EFS of the known prior art does not couple the file having crypto metadata 255 with a valid private key. Without something more, the file cannot be decrypted by active keystore 200 in FIG. 2A.

Figure 3:
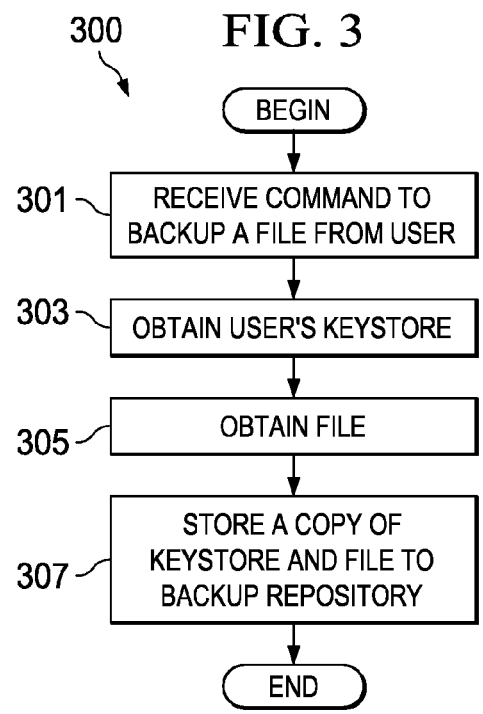
FIG. 3 is a flowchart of backing up a file in accordance with an illustrative embodiment of the invention.

FIG. 3 is a flowchart of backing up a file in accordance with an illustrative embodiment of the invention. Collectively, the steps of FIG. 3 are called backup 300. Initially, the data processing system receives a command to backup a file from a user (step 301). The data processing system obtains the user's keystore (step 303). As an example, at a previous time contemporaneous with T1 (see FIG. 2A), the data processing system may obtain keystore 211. At such a time, keystore 211 exists as an active keystore. Next, the data processing system may obtain the file (step 305). Next, the data processing system stores a copy of the keystore and the file to a backup repository (step 307). The backup repository may be offsite with respect to the data processing system. Attendant with step 307, the data processing system may assign a time-stamp to the keystore as well as to the file. Processing terminates thereafter.

The command to backup may specify a backup repository located offsite, with respect to the encrypting file system. Accordingly, step 307 may store the keystore and the file in a place that may escape impact from a common disaster with the encrypting file system. After backup 300, the data processing system may receive a command from the user, the command indicating that the user deprecates his key pair. Consequently, the data processing system may delete the keystore used in step 303 from the EFS.

Figure 4:
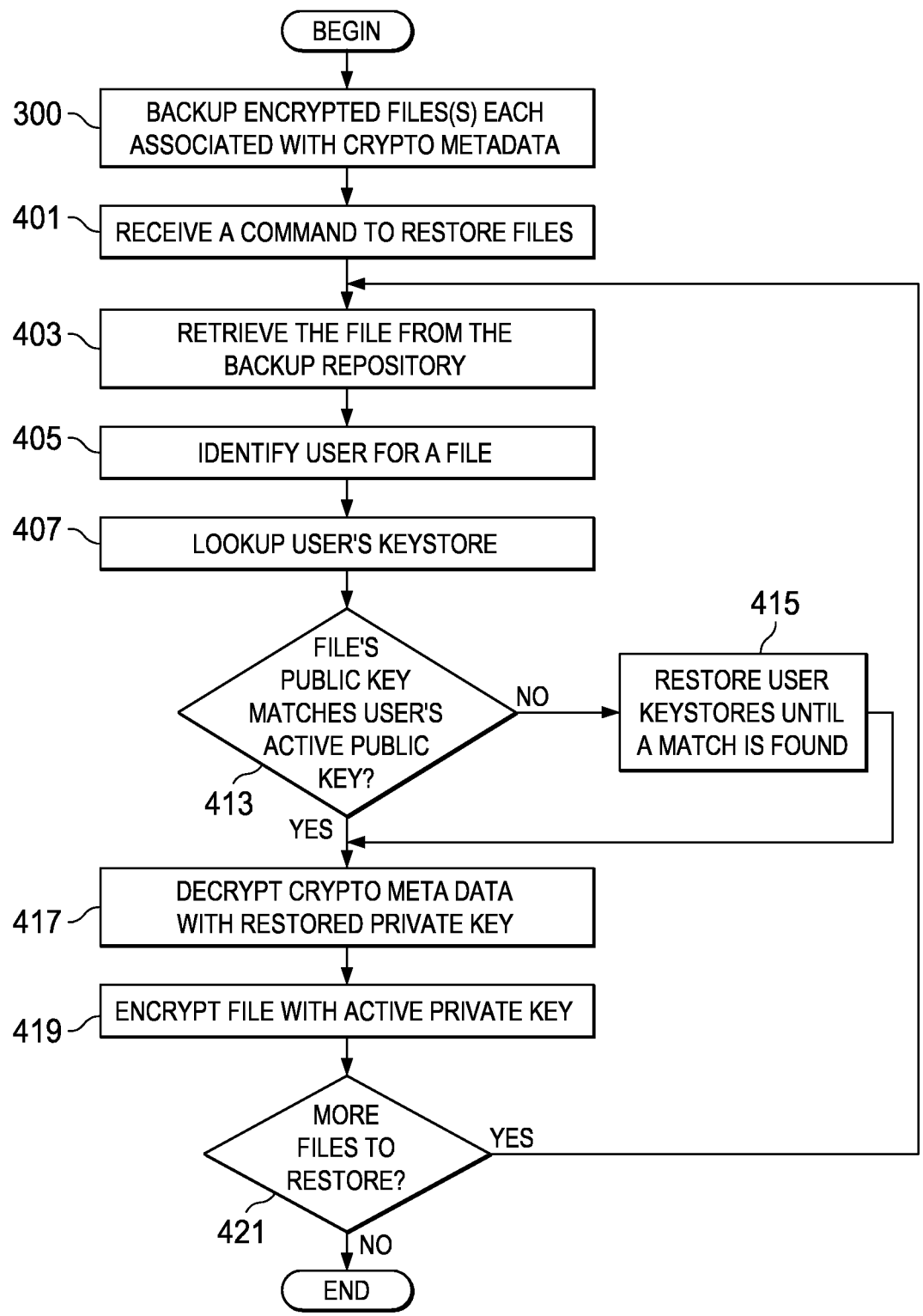
FIG. 4 is a flowchart of restoring a file in accordance with an illustrative embodiment of the invention.

FIG. 4 is a flowchart of steps restoring a file in accordance with an illustrative embodiment of the invention. Prior to backing up, the data processing system backs up encrypted files, each associated with crypto metadata, as shown in detail above and summarized as step 300. Initially, the data processing system receives a command to restore files (step 401). A command to restore files is a command received by an encrypting file system that describes a file that is to be restored. The command to restore may include an identification of a backup repository and a date. In addition, an identifier of a user, for example, a public key, may accompany the command.

Next, the data processing system retrieves the file from the backup repository (step 403). Next, the data processing system identifies a user for the file (step 405). The data processing system may perform identification by reading a public key of the file. Next, the data processing system looks up the user's keystore (step 407). The keystore is the active keystore, for example, keystore 200 of FIG. 2A. Next, the data processing system determines whether the file's public key matches the user's public key (step 413).

If the file's public key does not match the user's public key, the data processing system restores the user's keystore until a match is found (step 415). Restoring may include decrypting an encrypted user private key to form a restored private key. In the example backup repository 200 of FIG. 2A, the data processing system may sequentially restore keystores. Initially the data processing system may retrieve keystore 214, and then retrieve keystore 213, keystore 212, and finally keystore 211. Each keystore may have been previously backed up offsite from the data processing system. After a match is found, the data processing system continues with decrypting the file crypto metadata with a restored private key (step 417). A restored private key is a private key formed by decrypting a previously backed up and encrypted user private key. Each restoration of a keystore in step 415 yields another private key. In case step 415 found a match in the second keystore, step 417 uses that keystore, or the private key stored therein. Furthermore, if step 415 found a match in a subsequent keystore, step 417 uses that keystore for decrypting. Decrypting the file crypto metadata may comprise decrypting the encrypted file encryption key with the restored private key to form a decrypted file key. Decrypting comprises applying the restored private key as a key to decrypt the encrypted file encryption key. The net result of step 417 is to form the file encryption key.

Next, the data processing system may encrypt the file with an active private key of the first keystore (step 419). The active private key is, for example, the private key of the user's keystore of step 407. Encrypting the file may comprise encrypting the file encryption key, Fk, with the user's active private key. Next, the data processing system determines whether there are more files to restore (step 421). If there are more files to restore, processing continues at step 403. Otherwise, processing terminates thereafter.

The illustrative embodiments permit a user to select a file for restoration. Contemporaneously, aspects of the illustrative embodiments permit a user to update or otherwise refresh a file to use an active user keystore. A user may deprecate a keystore and still obtain the benefits of an earlier keystore with respect to files encrypted based on the deprecated keystore.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for restoring an encrypted file, the computer implemented method comprising:

a computer receiving a command to restore an encrypted file, wherein the encrypted file was previously backed up;

the computer identifying a user associated with the encrypted file;

the computer looking up a first keystore of the user based on the user, the first keystore having an active private key;

the computer determining that a public key of the encrypted file fails to match an active public key of the first keystore;

the computer restoring a second keystore of the user to form a restored private key, wherein the second keystore was previously backed up;

the computer, responsive to a determination that the public key of the encrypted file fails to match the active public key of the first keystore, determining that a second user active public key of the second keystore matches the public key of the encrypted file;

responsive to a determination that the second user active public key of the second keystore matches the public key of the encrypted file, decrypting an encrypted file encryption key based on the restored private key to crypto metadata of the file to form the file encryption key; and the computer encrypting the file encryption key with the active private key of the first keystore, wherein encrypting further comprises:

encrypting the file encryption key with the active private key to form replacement crypto metadata of the file; and replacing the crypto metadata of the file with replacement crypto metadata of the file, wherein the active private key is not a deprecated private key, and wherein the active public key is not a deprecated public key.

2. The computer implemented method of claim 1, wherein the encrypted file was previously backed up offsite in relation to the step of decrypting the encrypted file; and the second keystore of the user was previously backed up offsite in relation to the step of restoring the second keystore.

3. The computer implemented method of claim 2, wherein the computer restoring the second keystore of the user to form a restored private key, wherein the second keystore was previously backed up comprises retrieving the second keystore.

4. The computer implemented method of claim 2, wherein restoring a second keystore of the user to form a restored private key, wherein the second keystore was previously backed up further comprises:

determining that the public key of the encrypted file fails to match the active public key of the second keystore;

responsive to a determination that the public key of the encrypted file fails to match the active public key of the second keystore, restoring a third keystore; and treating the third keystore as the second keystore.

5. The computer implemented method of claim 2, wherein identifying a user associated with the encrypted file further comprises retrieving the encrypted file.

6. The computer implemented method of claim 1, wherein restoring the second keystore of the user to form a restored private key further comprises retrieving the second keystore; and obtaining the private key of the second keystore by decrypting an encrypted private key of the second keystore using a password of the user.

7. A data processing system comprising:

a bus;

a storage device connected to the bus, wherein computer usable code is located in the storage device;

a communication unit connected to the bus;

a processing unit connected to the bus, wherein the processing unit executes the computer usable code for restoring an encrypted file, the processing unit further executes the computer usable code to receive a command to restore an encrypted file, wherein the encrypted file was previously backed up;

identify a user associated with the encrypted file; look up a first keystore of the user based on the user, the first keystore having an active private key;

determine that a public key of the encrypted file fails to match an active public key of the first keystore;

restore a second keystore of the user to form a restored private key, wherein the second keystore was previously backed up;

responsive to a determination that the public key of the encrypted file fails to match the active public key of the first keystore, determine that a second user active public key of the second keystore matches the public key of the encrypted file;

responsive to a determination that the second user active public key of the second keystore matches the public key of the encrypted file, decrypt an encrypted file encryption key based on the restored private key to crypto metadata of the file to form the file encryption key; and encrypt the decrypted file with the active private key of the first keystore, wherein encrypting further comprises:

encrypting the file encryption key with the active private key to form replacement crypto metadata of the file; and replacing the crypto metadata of the file with replacement crypto metadata of the file, wherein the active private key is not a deprecated private key, and wherein the active public key is not a deprecated public key.

8. The data processing system of claim 7, wherein the encrypted file was previously backed up offsite in relation to decrypting the encrypted file; and the second keystore of the user was previously backed up offsite in relation to restoring the second keystore.

9. The data processing system of claim 8 wherein in executing the computer usable code for restoring the second keystore the processing unit executes computer usable program code to retrieve the second keystore.

10. The data processing system of claim 8 wherein in executing the computer usable code for restoring, the processing unit executes computer usable program code to determine that the public key of the encrypted file fails to match the active public key of the second keystore; responsive to a determination that the public key of the encrypted file fails to match the active public key of the second keystore, restore a third keystore; and treat the third keystore as the second keystore.

11. The data processing system of claim 8 wherein in executing computer usable program code to identify a user associated with the encrypted file, the processing unit executes computer usable program code to retrieve the encrypted file.

12. The data processing system of claim 7, wherein in executing the computer usable program code to restore the second keystore of the user to form a restored private key, the processing unit executes the computer usable program code to retrieve the second keystore; and obtain the private key of the second keystore by decrypting an encrypted private key of the second keystore using a password of the user.

13. A computer program product for restoring an encrypted file, the computer program product comprising:

one or more computer-readable, storage devices and computer-readable program instructions which are stored on the one or more storage devices and when executed by one or more processors;

program instructions, stored on at least one of the one or more storage devices, to receive a command to restore an encrypted file, wherein the encrypted file was previously backed up;

program instructions, stored on at least one of the one or more storage devices, to identify a user associated with the encrypted file;

program instructions, stored on at least one of the one or more storage devices, to look up a first keystore of the user based on the user, the first keystore having an active private key;

program instructions, stored on at least one of the one or more storage devices, to determine that a public key of the encrypted file fails to match an active public key of the first keystore;

program instructions, stored on at least one of the one or more storage devices, to restore a second keystore of the user to form a restored private key, wherein the second keystore was previously backed up;

program instructions, stored on at least one of the one or more storage devices, responsive to a determination that the public key of the encrypted file fails to match the active public key of the first keystore, to determine that a second user active public key of the second keystore matches the public key of the encrypted file;

program instructions, stored on at least one of the one or more storage devices, responsive to a determination that the second user active public key of the second keystore matches the public key of the encrypted file, to decrypt an encrypted file encryption key based on the restored private key to crypto metadata of the file to form the file encryption key; and program instructions, stored on at least one of the one or more storage devices, to encrypt the file encryption key with the active private key of the first keystore, wherein program instructions, stored on at least one of the one or more storage devices, to encrypt further comprises:

program instructions, stored on at least one of the one or more storage devices, to encrypt the file encryption key with the active private key to form replacement crypto metadata of the file; and program instructions, stored on at least one of the one or more storage devices, to replace the crypto metadata of the file with replacement crypto metadata of the file, wherein the active private key is not a deprecated private key, and wherein the active public key is not a deprecated public key.

14. The computer program product of claim 13, wherein the encrypted file was previously backed up offsite in relation to decrypting the encrypted file; and the second keystore of the user was previously backed up offsite in relation to restoring the second keystore.

15. The computer program product of claim 14 wherein the program instructions, stored on at least one of the one or more storage devices, to restore the second keystore comprises program instructions, stored on at least one of the one or more storage devices, to retrieve the second keystore.

16. The computer program product of claim 14 wherein computer usable program code for restoring further comprises:

program instructions, stored on at least one of the one or more storage devices, to determine that the public key of the encrypted file fails to match the active public key of the second keystore;

program instructions, stored on at least one of the one or more storage devices, to, responsive to a determination that the public key of the encrypted file fails to match the active public key of the second keystore, restore a third keystore; and program instructions, stored on at least one of the one or more storage devices, to treat the third keystore as the second keystore.

17. The computer program product of claim 14 wherein program instructions, stored on at least one of the one or more storage devices, to identify a user associated with the encrypted file further comprises program instructions, stored on at least one of the one or more storage devices, to retrieve the encrypted file.

* * * * *